UNITED STATES PATENT OFFICE.

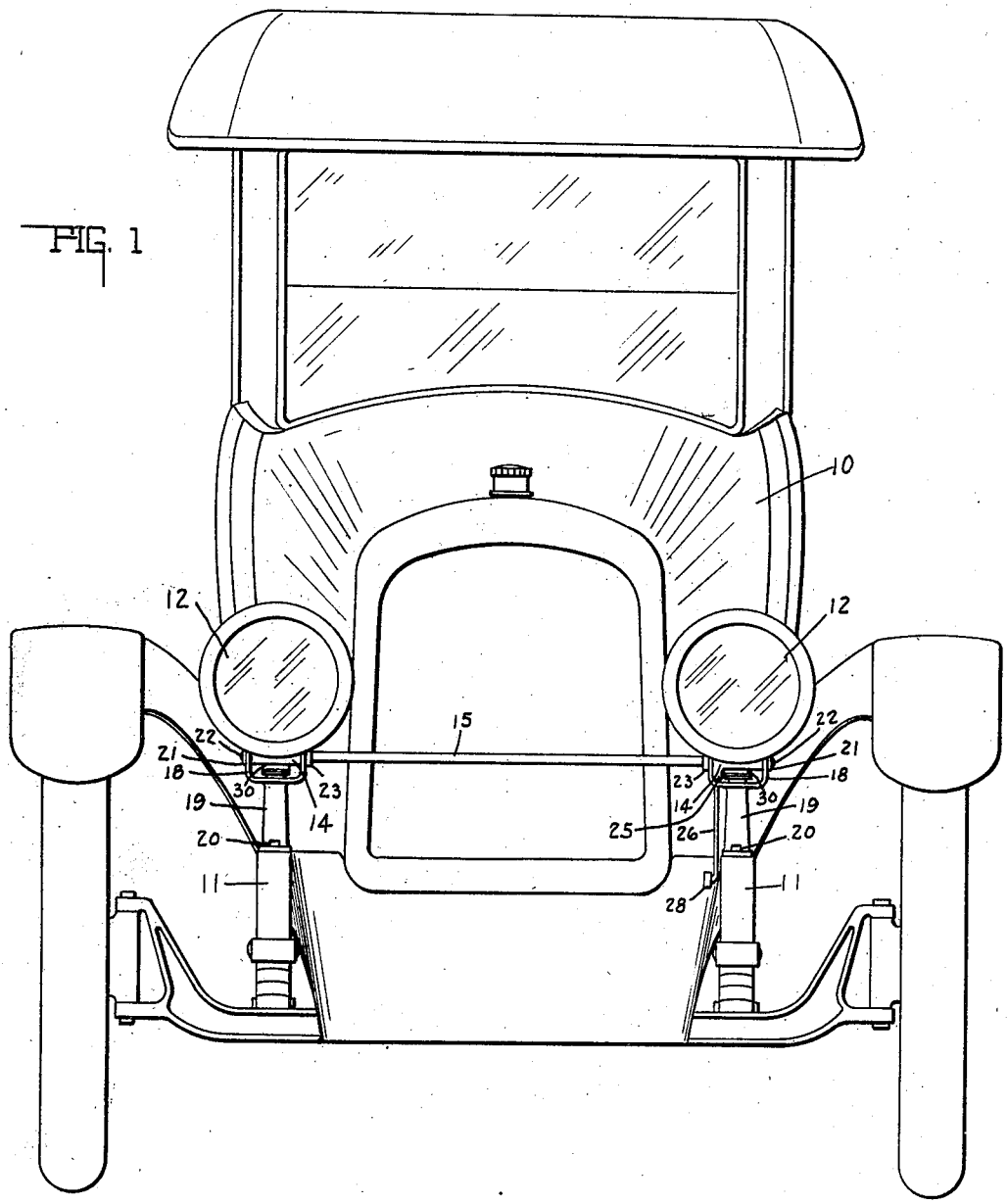

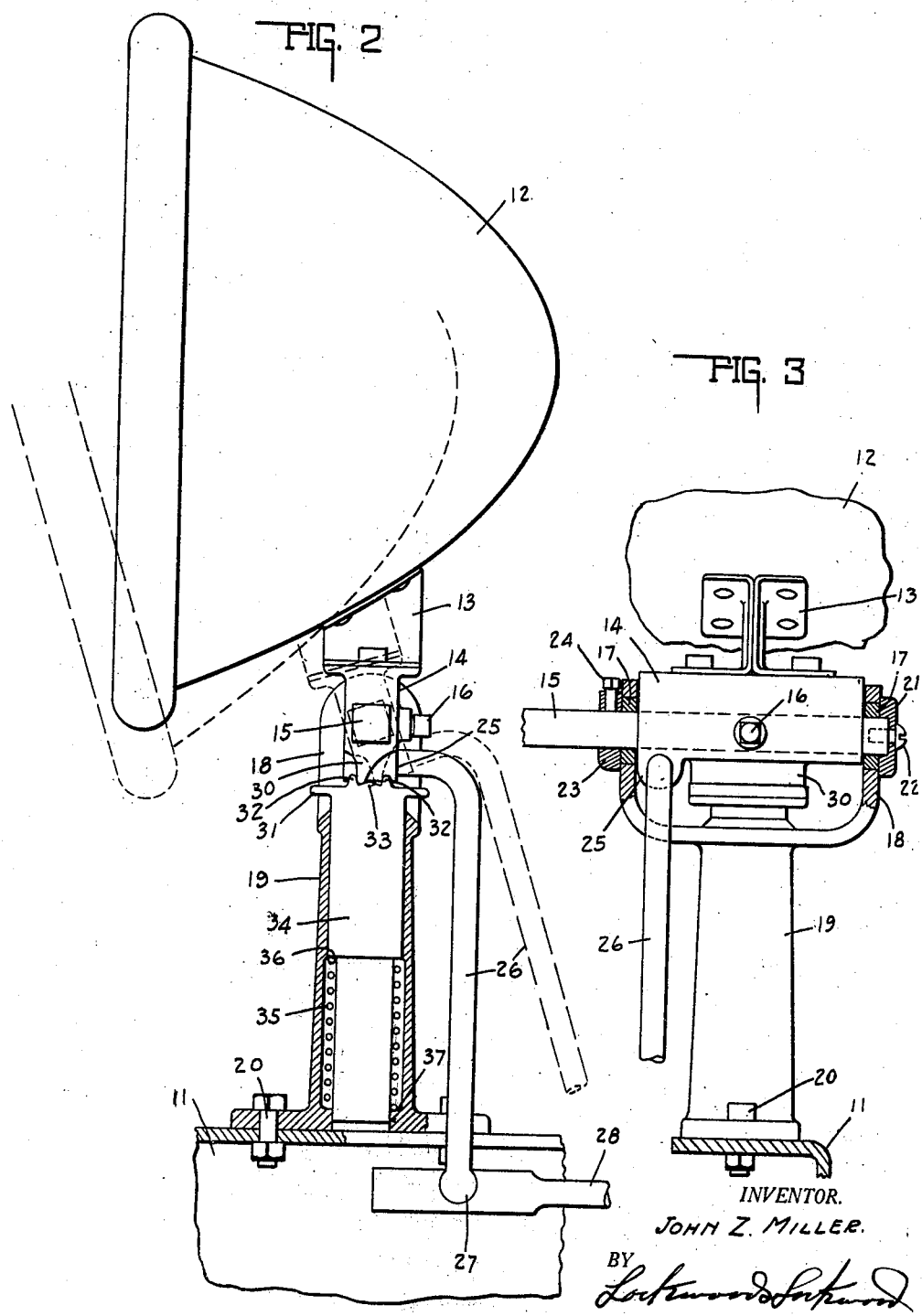

JOHN Z. MILLER, OF INDIANAPOLIS, INDIANA.

TILTING-HEADLIGHT CONSTRUCTION.

1,376,962.   Specification of Letters Patent.   Patented May 3, 1921.

Application filed March 13, 1920. Serial No. 365,379.

*To all whom it may concern:*

Be it known that I, JOHN Z. MILLER, a citizen of the United States, and a resident of Indianapolis, county of Marion, and State of Indiana, have invented a certain new and useful Tilting-Headlight Construction; and I do hereby declare that the following is a full, clear, and exact description thereof, reference being had to the accompanying drawings, in which like numerals refer to like parts.

The object of this invention is to provide a simple, effective and strong practical means for mounting headlights on automobiles, so that they can be tilted for dimming purposes and the parts be held so that they will not rattle or make a noise.

Another feature of said invention is to make such a structure as to enable automobiles already provided with headlights to be equipped with this invention cheaply and by unskilled persons.

The chief feature of the invention consists in mounting the headlights on vertically extensible means, the parts of which are held tightly in their adjusted positions by springs which must be overcome in tilting the headlights either to the downward or dimming position, or to the upward and straight forward position. In carrying out this feature of the invention a tubular stand is provided under each headlight having means in which each headlight supporting bracket is pivotally mounted to permit the tilting of the headlight, and a lock or holder vertically movable in said hollow stand and forcibly pressed upward by a strong spring for engaging the lower end of the headlight supporting bracket and holding it tightly in its adjusted positions against both movement and rattling. The two headlights are thus mounted, so that they are both adjustable by a single means operated from the seat of the automobile.

The full nature of the invention will be understood from the accompanying drawings and the following description and claims.

In the drawings Figure 1 is a front elevation of an automobile equipped with a pair of tilting headlights and the means herein set forth for tilting the same. Fig. 2 is a side elevation of one headlight and the means for mounting and tilting it, parts being shown in central vertical section, and other parts being broken away. Fig. 3 is a front view of the means for supporting a headlight, parts being broken away and parts being shown in section.

There is shown herein an automobile 10 having a longitudinal frame bar 11 and a pair of headlights 12. Each headlight has secured to its under side a bracket 13 of the usual construction which is secured rigidly to a rocking member 14 that has extending transversely through it a square opening, whereby it is fitted on a rod 15 that extends from one headlight to the other. The end portions of the rod 15 are square to fit into said opening snugly and the member 14 is secured in place on said rod 15 by a set screw 16.

On each side of said member 14 there is a round bearing 17 having a square hole through it so as to fit snugly on the square portion of the rod 15 and yet have bearing in the arms 18 which extend upward from the hollow stand 19 that is secured by the bolts 20 on the frame bar 11. On the outer end of the rod 15 a cap 21 is secured by the screw 22, and on the other side of the headlight mounting there is a collar 23 secured on the rod 15 by a set screw 24 so as to prevent displacement of the rod 15 and the parts associated therewith.

The mounting of the headlights above described permits them to be tilted vertically, and such tilting movement may be accomplished by any suitable means heretofore employed. That herein shown consists of a lug or ear 25 extending downward from the member 14 and to which an arm 26 is rigidly secured. Said arm extends downward beside the stand 19 and its lower end carries a ball 27 that fits in a socket in a rod 28 that extends back to the front part of the body of the automobile, whereby it is operated by the driver of the automobile. When the rod 28 is actuated rearwardly it will tilt the headlight and the arm 26 to the dotted line position, and when forced forwardly, said parts will be brought to their normal full line position.

This invention is not necessarily limited to the particular means heretofore described for mounting the headlights so they are tiltable, but the chief feature thereof consists in means for locking and holding the headlights in adjusted position so they will not rattle. To this end there is a V-shaped rib 30 extending downward from the member 14 which carries the headlight, and said rib extends transversely of the automobile. Below said rib 30 there is a plate 31 having on its upper surface a pair of transversely extending parallel ribs 32 between which there is a slight transversely extending elevation 33 which leaves between it and each of said ribs 32 a transversely extending groove adapted to receive the apex of the V-shaped projection 30. Said plate 31 is secured on a post 34 that is mounted within the tubular stand 19 so as to be vertically movable and is forced upwardly by the spiral spring 35. For this purpose the spring 35 surrounds the lower portion of the post 34 and lies within the stand 19 and the upper end of the spring pushes upwardly against an annular shoulder 36 on said post and its lower end rests on an annular shoulder or seat 37 in the stand 19.

In the foregoing construction the spring 35 always forces upwardly with considerable power the plate 31 which carries the ribs 32 and the intermediate elevation 33. The parts are arranged so that when the headlight is in normal position the apex of the V-shaped projection lies in the groove between the front rib 32 and the intermediate elevation 33, as shown in Fig. 2. When the headlight is tilted, said V-shaped projection rests in the groove between the rear rib 32 and the intermediate elevation 33, as indicated by dotted lines in Fig. 2. The spring 35 so strongly forces the plate 31 upward that said ribs 32 and intermediate elevation 33 will prevent any movement of the V-shaped projection 30, unless the headlight and V-shaped projection are forcibly moved for tilting the same by the means shown and described. When power is applied to the rod 28 for tilting the headlight, the intermediate elevation 33 under the influence of the spring 35 resists the oscillatory movement of the V-shaped projection 30, until the power applied to the rod 28 is sufficient to overcome the action of the spring 35, whereupon the rocking of the headlight is effected. In whatever position the headlights are placed the construction described will prevent any rattling or looseness of the parts and any noise and the parts will always be held firmly in their proper and adjusted positions.

The invention claimed is:

1. The combination of a headlight, a support therefor having a transversely extending rib, relatively stationary means in which said headlight support is pivotally mounted so that the headlight can be tilted, means for forcibly tilting the headlight, and a spring pressed plate bearing against said rib and having transverse depressions with elevations beside the same bearing against said rib for yieldingly holding it from movement excepting when forcibly actuated.

2. The combination of a headlight, a headlight support having on its lower end a lateral V-shaped projection, a relatively stationary hollow stand in connection with the upper end of which the headlight support is pivotally mounted so as to be tiltable, a post vertically slidable in said stand with a plurality of transverse ribs on the upper end thereof having grooves to receive the apex of said V-shaped projection, a spring forcing said post upward against the headlight support, and means for forcibly tilting said headlight support and headlight.

3. The combination of a headlight, a headlight support having on its lower end a lateral V-shaped projection, a relatively stationary hollow stand in connection with the upper end of which the headlight support is pivotally mounted so as to be tiltable, a post vertically slidable in said stand with a plurality of transverse ribs on the upper end thereof having grooves to receive the apex of said V-shaped projection, a spiral spring surrounding said post and located within said hollow stand with its lower end bearing against a shoulder in the hollow stand and its upper end against a shoulder on said post, an arm secured to said headlight support, and a rod connected with said arm for operating the same.

4. The combination of a headlight, a headlight support having a transverse opening through it, a rod extending through said opening and rigid in relation to said support, a relatively stationary hollow stand, a pair of arms extending upward from the stand in which said rod is oscillatably mounted, and a spring pressed post mounted in said hollow stand with its upper end yieldingly engaging the lower end of said headlight support for resisting movement thereof and preventing rattling.

5. A pair of headlights, a headlight support for each headlight having a transverse opening through the same, a transversely extending rod with its ends fitting in the supports for both headlights, means for securing said supports to said rod, a relatively stationary stand under each headlight on the upper end of which said rod is oscillatably mounted, means for forcibly oscillating said rod and thus tilting the headlights to their different positions, and spring pressed means for engaging each headlight support and resisting any movement thereof and preventing rattling of the same.

In witness whereof, I have hereunto affixed my signature.

JOHN Z. MILLER.